(12) United States Patent
Tawa

(10) Patent No.: US 10,797,742 B2
(45) Date of Patent: Oct. 6, 2020

(54) RECEIVING CIRCUIT, RECEIVING APPARATUS AND RECEIVING METHOD

(71) Applicant: NEC Corporation, Tokyo (JP)

(72) Inventor: Noriaki Tawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 309 days.

(21) Appl. No.: 15/780,772

(22) PCT Filed: Dec. 4, 2015

(86) PCT No.: PCT/JP2015/006037
§ 371 (c)(1),
(2) Date: Jun. 1, 2018

(87) PCT Pub. No.: WO2017/094045
PCT Pub. Date: Jun. 8, 2017

(65) Prior Publication Data
US 2020/0252095 A1    Aug. 6, 2020

(51) Int. Cl.
*H04B 1/16*    (2006.01)
*H04B 1/06*    (2006.01)

(52) U.S. Cl.
CPC ................... *H04B 1/1607* (2013.01)

(58) Field of Classification Search
CPC .......... H01B 1/04; H01B 1/40; H01B 1/7183; H01B 2001/0491; H04L 27/06; H04L 27/22; H04L 27/34
See application file for complete search history.

(56) References Cited

U.S. PATENT DOCUMENTS 6,559,645 B2 *  5/2003  Arndt ..................... G01V 3/104
                                                    324/233
6,987,794 B1 *  1/2006  Kohno ................. H04B 1/7156
                                                    375/132
(Continued)

FOREIGN PATENT DOCUMENTS

JP    2008-098785 A    4/2008
JP    2011-524117 A    8/2011
(Continued)

OTHER PUBLICATIONS

Decision to Grant a Patent dated Mar. 12, 2019 issued by the Japanese Patent Office in counterpart application No. 2017-553476.
(Continued)

*Primary Examiner* — Quochien B Vuong
(74) *Attorney, Agent, or Firm* — Sughrue Mion, PLLC

(57) ABSTRACT

According to an embodiment, a receiving circuit includes an envelope signal generating unit configured to output an envelope signal of a received RF signal, an amplitude signal generating unit configured to binarize the envelope signal which is captured in synchronization with a reference clock signal and output the binarized envelope signal as an amplitude signal, and a phase signal generating unit configured to binarize a phase component of the RF signal and output the binarized phase component as a phase signal, in which a digital RF signal is generated based on the amplitude signal and the phase signal.

17 Claims, 15 Drawing Sheets

(56) References Cited

U.S. PATENT DOCUMENTS

| | | | |
|---|---|---|---|
| 7,630,460 B2* | 12/2009 | Mimura | H04B 1/7183 |
| | | | 375/140 |
| 8,174,428 B2 | 5/2012 | Wegener | |
| 8,971,427 B2* | 3/2015 | Akita | H04L 27/2657 |
| | | | 375/260 |
| 9,461,852 B2* | 10/2016 | Dasgupta | H04L 27/06 |
| 2005/0124310 A1* | 6/2005 | Yamamoto | H04B 1/1661 |
| | | | 455/296 |
| 2008/0252367 A1* | 10/2008 | Pettersen | H04L 27/06 |
| | | | 329/311 |
| 2010/0177760 A1 | 7/2010 | Cannon et al. | |
| 2013/0143501 A1 | 6/2013 | Huang et al. | |

FOREIGN PATENT DOCUMENTS

| | | |
|---|---|---|
| JP | 2012-515507 A | 7/2012 |
| WO | 2005/062477 A2 | 7/2005 |
| WO | 2007/074413 A1 | 7/2007 |

OTHER PUBLICATIONS

Masaaki Tanio et al., "A Linear and Efficient 1-bit Digital Transmitter with Envelope Delta-sigma Modulation," IEICE Technical Report, The Institute of Electronics, Information and Communication Engineers, Jan. 8, 2015, pp. 89-94 (8 pages), vol. 114, No. 392.
International Search Report of PCT/JP2015/006037 dated Feb. 23, 2016.

* cited by examiner

RECEIVING CIRCUIT, RECEIVING APPARATUS AND RECEIVING METHOD

CROSS REFERENCE TO RELATED APPLICATIONS

This application is a National Stage of International Application No. PCT/JP2015/006037 filed Dec. 4, 2015.

TECHNICAL FIELD

The present invention relates to a receiving circuit, a receiving apparatus and a receiving method, for example, to a receiving circuit, a receiving apparatus and a receiving method suitable for preventing an increase in a circuit size.

BACKGROUND ART

In recent years, MIMO (Multiple Input and Multiple Output) techniques in which radio communication is performed through a plurality of antennas have begun to be adopted in radio communication systems in order to expand a capacity of communication. Especially, in Massive-MIMO techniques in which radio communication is performed through several tens of antennas to several hundreds of antennas, the number of receiving circuits (radio units) in the radio base station has been increased.

Note that in an ordinary receiving circuit, analog processing circuits such as a mixer, a local oscillator and an AD converter are provided in order to convert a wirelessly-received RF (Radio Frequency) signal into a baseband signal. For the above reason, in ordinary receiving circuits, the circuit has become lager and its power consumption has increased.

To solve the problem described above, for example, Patent Literature 1 discloses a configuration of a receiving device which is designed to reduce the power consumption by changing a receiving mode according to a ratio of desired waves to interference waves.

CITATION LIST

Patent Literature

Patent Literature 1: Japanese Unexamined Patent Application Publication No. 2008-98785

SUMMARY OF INVENTION

Technical Problem

However, in the configuration disclosed in Patent Literature 1, there is a problem that the circuit has become larger since analog processing circuits such as a mixer, a local oscillator and an AD converter are provided. Other problems and novel features will be made apparent from the following descriptions and the accompanying drawings.

The present invention has been made to solve the above problems and an object thereof is to provide a receiving circuit, a receiving apparatus and a receiving method capable of preventing an increase in a circuit size.

Solution to Problem

According to an embodiment, a receiving circuit includes:
envelope signal generating means for outputting an envelope signal of a received RF signal;
amplitude signal generating means for binarizing the envelope signal which is captured in synchronization with a reference clock signal and outputting the binarized envelope signal as an amplitude signal;
phase signal generating means for binarizing a phase component of the RF signal and outputting the binarized phase component as a phase signal; and
digital RF signal generating means for outputting a digital RF signal based on the amplitude signal and the phase signal.

Further, according to another embodiment, a receiving method includes:
a step of outputting an envelope signal of a received RF signal;
a step of binarizing the envelope signal which is captured in synchronization with a reference clock signal and outputting the binarized envelope signal as an amplitude signal;
a step of binarizing a phase component of the RF signal and outputting the binarized phase component as a phase signal; and
a step of generating a digital RF signal based on the amplitude signal and the phase signal.

Advantageous Effects of Invention

According to the embodiment, it is possible to provide a receiving circuit, a receiving apparatus and a receiving method capable of preventing an increase in a circuit size.

DESCRIPTION OF EMBODIMENTS

Embodiments are explained hereinafter with reference to the drawings. Note that the drawings are given in a simplified form, and thus are not considered to be limiting the technical scope of embodiments. Further, the same elements are denoted by the same reference symbols, and duplicated explanations are omitted.

In the following embodiments, when necessary, they are explained while dividing them into separate sections or separate embodiments. However, those embodiments are not unrelated to each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a positional relation, or the like of a component(s) or the like is mentioned, shapes or the like that are substantially similar to or resemble that shape are also included in that shape except for cases where it is explicitly specified or they are eliminated based on its principle. This is also true for the aforementioned numbers or the like (including numbers, values, quantities, ranges, and the like).

First Embodiment

Figure 1:
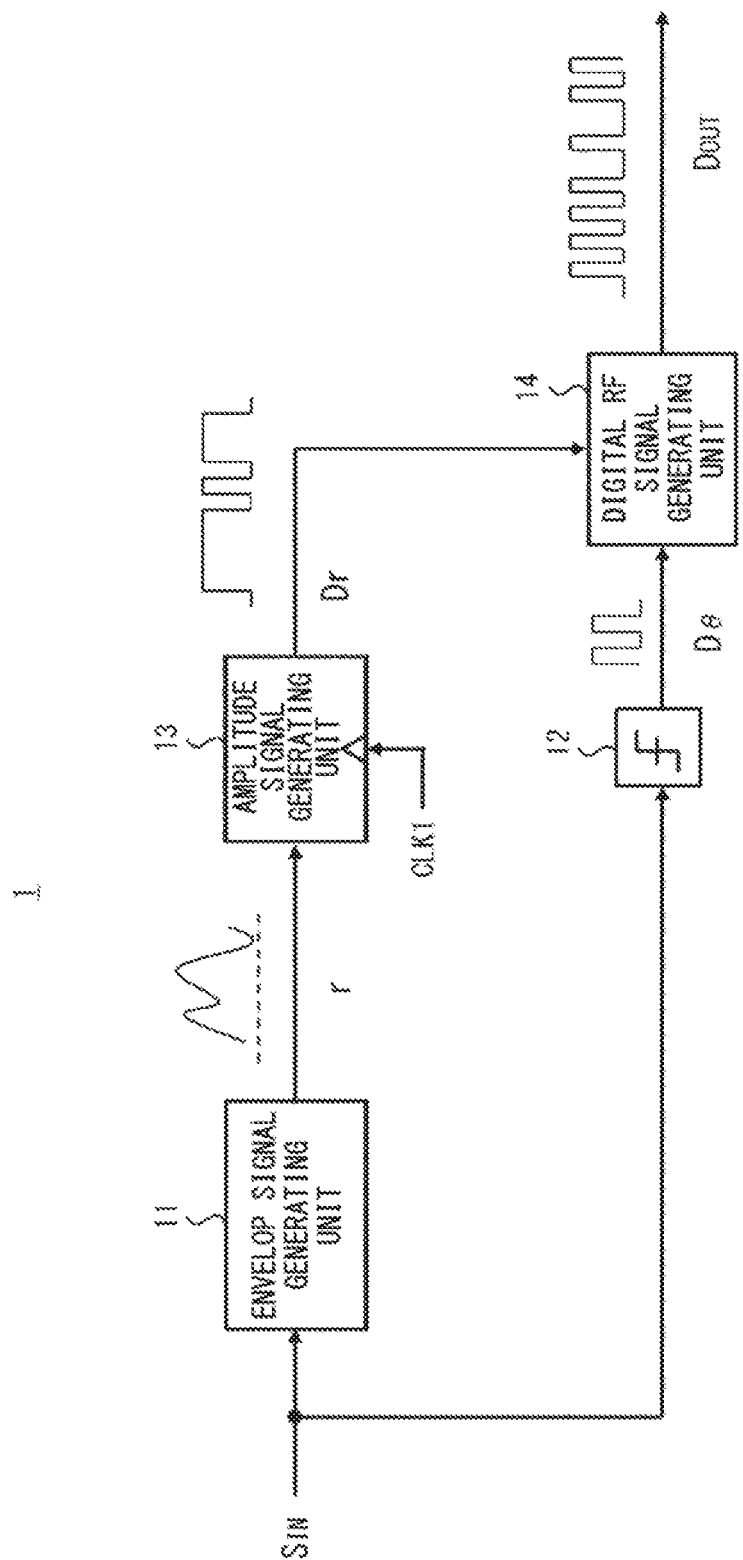
FIG. 1 is a block diagram showing a configuration of a receiving circuit according to a first embodiment.

FIG. 1 is a block diagram showing a configuration of a receiving circuit 1 according to a first embodiment.

Figure 2:
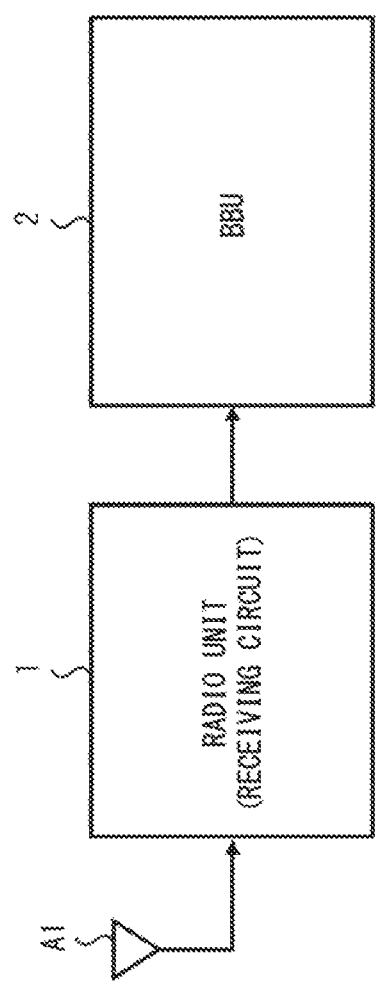
FIG. 2 is a block diagram showing a radio base station with a receiving circuit shown in FIG. 1 mounted therein.

Referring to FIG. 2, the receiving circuit 1 shown in FIG. 1 is, for example, a radio unit (slave station) in a radio base station (receiving apparatus). On a receiving side of the radio unit, the receiving circuit 1 extracts and binarizes an amplitude component and a phase component of an analog RF signal wirelessly-received through an antenna A1, and then generates a digitalized received signal (digital RF signal) based on the binarized amplitude component signal (amplitude signal) and the phase component signal (phase signal). This digital RF signal is down-converted into a baseband signal or an IF (Intermediate Frequency) signal by a digital processing circuit at the subsequent stage and, for example, after being converted into an optical signal, transmitted to a baseband processing unit (BBU; Base Band Unit) (master station) 2 in the radio base station through an optical cable. Note that the receiving circuit 1 does not need to be equipped with a mixer, a local oscillator, etc. when converting the analog RF signal into a digital signal. Further, the receiving circuit 1 does not need to be equipped with a multi-bit AD converter as well. Therefore, the receiving circuit 1 can prevent an increase in a circuit size. This is specifically described hereinbelow.

As shown in FIG. 1, the receiving circuit 1 includes an envelope signal generating unit 11 for outputting an envelope signal of a received RF signal, an amplitude signal generating unit 13 for binarizing the envelope signal which is captured in synchronization with a reference clock signal and outputting the binarized envelope signal as an amplitude signal, a phase signal generating unit 12 for binarizing a phase component of the RF signal and outputting the binarized phase component as a phase signal, and a digital RF signal generating unit 14 for outputting a digital RF signal based on the amplitude signal and the phase signal.

The envelope signal generating unit 11 outputs an envelope signal r by detecting an amplitude of a RF signal $S_{IN}$ which is wirelessly received from the outside.

(Configuration Example of Envelope Signal Generating Unit 11)

Figure 3:
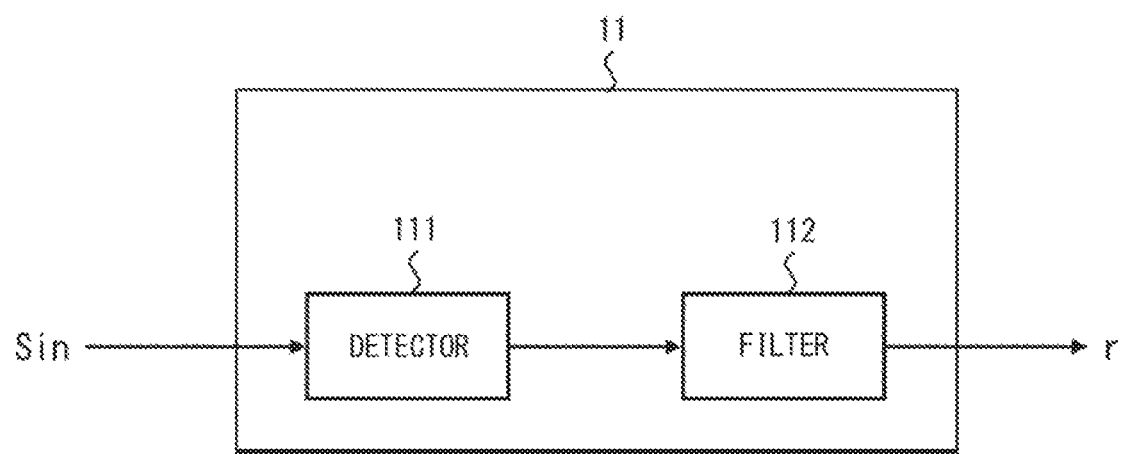
FIG. 3 is a block diagram showing a configuration example of an envelope signal generating unit provided in the receiving circuit shown in FIG. 1.

FIG. 3 is a block diagram showing a configuration example of the envelope signal generating unit 11.

Referring to FIG. 3, the envelope signal generating unit 11 includes a detector 111 and a filter 112. The detector 111 generates a voltage signal in proportion to the amplitude of the RF signal $S_{IN}$. The filter 112 lets only an envelope component of the voltage signal output from the detector 111 pass therethrough while removing unnecessary components included in the voltage signal and outputs the passing envelop component as an envelope signal r.

Figure 4:
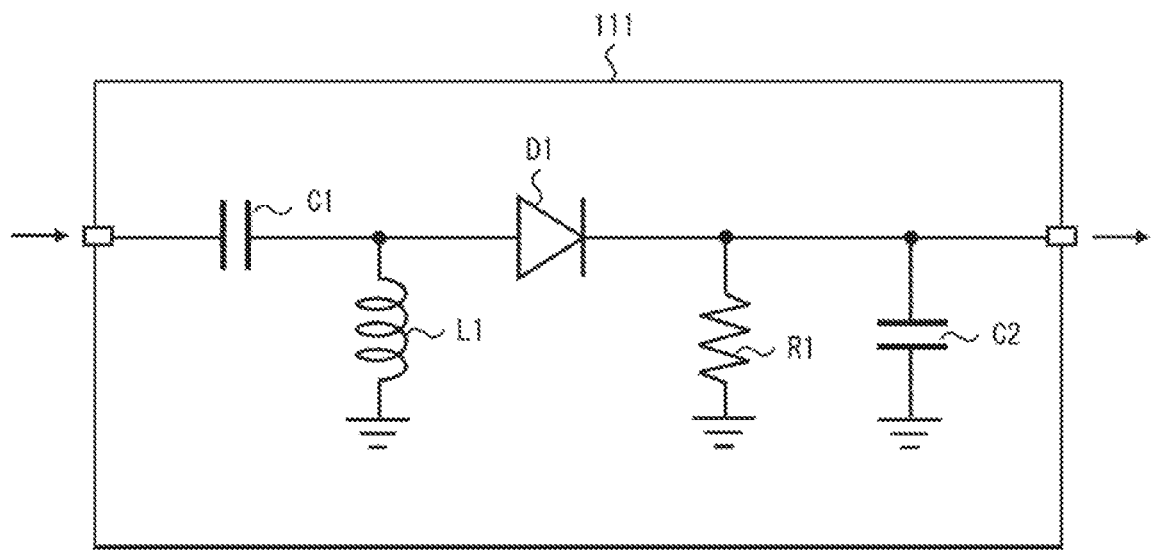
FIG. 4 shows a configuration example of a detector provided in the receiving circuit shown in FIG. 1.

FIG. 4 shows a specific configuration example of the detector 111.

Referring to FIG. 4, the detector 111 includes capacitive elements C1 and C2, a diode D1, a coil L1 and a resistive element R1. The diode D1 is provided between input and output terminals of the detector 111. The capacitive element C1 is provided between the input terminal of the detector 111 and an anode of the diode D1. The coil L1 is provided between the anode of the diode D1 and a ground voltage terminal GND. The resistive element R1 and the capacitive element C2 are provided in parallel between a cathode of the diode D1 and the ground voltage terminal GND. Note that the configuration of the detector 111 is not limited to the one shown in FIG. 4 and can be modified as appropriate to other configurations having an equivalent function.

Figure 5:
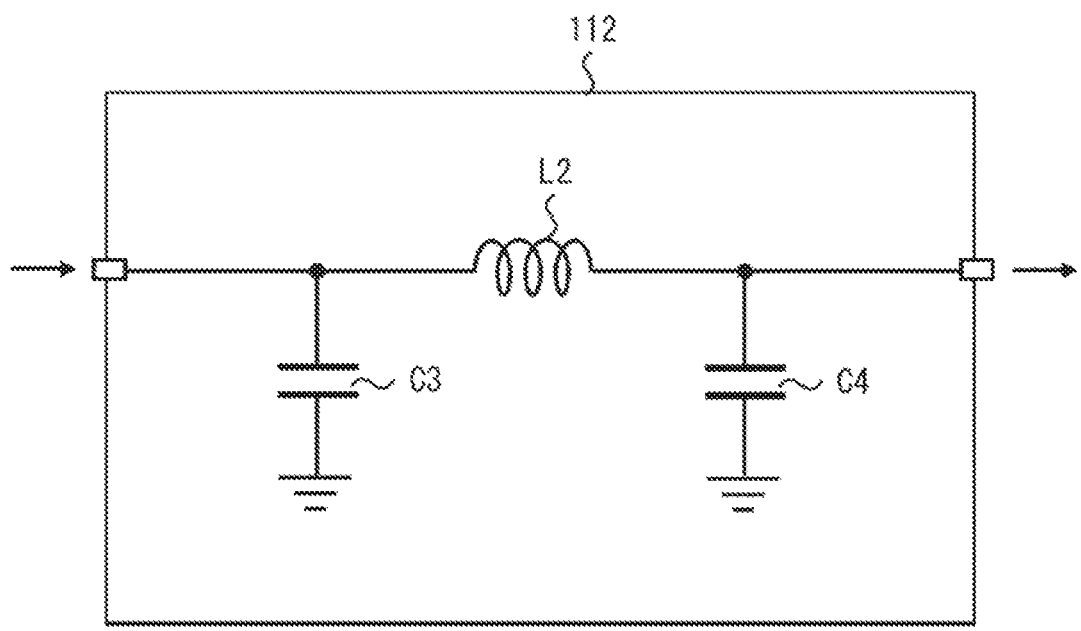
FIG. 5 shows a configuration example of a filter provided in the receiving circuit shown in FIG. 1.

FIG. 5 shows a specific configuration example of the filter 112.

Referring to FIG. 5, the filter 112 includes capacitive elements C3 and C4 and a coil L2. The coil L2 is provided between input and output terminals of the filter 112. The capacitive elements C3 is provided between one of the ends of the coil L2 connected to the input terminal of the filter 112 and the ground voltage terminal GND. The capacitive element C4 is provided between the other end of the coil L2 connected to the output terminal of the filter 112 and the ground voltage terminal GND. Note that the configuration of the filter 112 is not limited to the one shown in FIG. 5 and can be modified as appropriate to other configurations having an equivalent function. Further, if necessary, an impedance of the filter 112 can be adjusted by adding, for example, a voltage follower circuit with an operational amplifier on each of or one of the input and output sides of the filter 112. Further, the filter 112 can be omitted when necessary envelope components are obtained by a high-frequency component eliminating characteristic of the detector 111.

The phase signal generating unit 12 detects a phase of the RF signal $S_{IN}$ and generates a binarized digital phase signal $D_\theta$. Specifically, the phase signal generating unit 12 is a comparator, and compares the RF signal $S_{IN}$ with a reference voltage Vref and outputs the comparison result expressed as a binary value of −1 or 1 as the phase signal $D_\theta$. The reference voltage Vref is, for example, a ground voltage level (0V).

The amplitude signal generating unit 13 captures the envelope signal r generated by the envelope signal generating unit 11 in synchronization with a reference clock signal CLK1 and outputs the captured envelope signal as an amplitude signal Dr expressed as a binary value of 0 or 1. Note that the reference clock signal CLK1 has preferably an ordinary signal waveform in which a voltage level is switched at regular intervals, but it is not necessarily limited thereto. However, the reference clock signal CLK1 is a different signal from the phase signal $D_\theta$ generated by the phase signal generating unit 12.

For example, the amplitude signal generating unit 13 outputs the amplitude signal Dr having a value "1" when the value of envelope signal r is higher than a predetermined value, and the amplitude signal Dr having a value "0" when the value of the envelope signal r is equal to or lower than the predetermined value. Alternatively, the amplitude signal generating unit 13 outputs the amplitude signal Dr having a value "1" for a period corresponding to magnitude of the value of the envelope signal r (i.e., magnitude of the amplitude). The amplitude signal generating unit 13 will be explained in detail later.

The digital RF signal generating unit 14 multiplies the digital amplitude signal Dr output from the amplitude signal generating unit 13 by the digital phase signal $D_\theta$ generated by the phase signal generating unit 12, and outputs a digital RF signal $D_{OUT}$. Note that the digital RF signal $D_{OUT}$ is obtained by multiplying the amplitude signal Dr representing the amplitude component of the RF signal $S_{IN}$ by the phase signal $D_\theta$ representing the phase component thereof. Therefore, it can be said that the digital RF signal $D_{OUT}$ is a binarized digital RF signal having information of the analog RF signal $S_{IN}$.

This digital RF signal $D_{OUT}$, for example, is down-converted into a baseband signal or an IF signal by performing down-converting, filtering or down-sampling with a digital processing circuit (not shown in FIG. 1) formed in an FPGA (Field Programmable Gate Array) etc. Then, this baseband signal or IF signal is, for example, after being converted into an optical signal, transmitted to an external master station (not shown) through an optical cable.

(Calculation Formula)

Next, the digital RF signal $D_{OUT}$ generated by the receiving circuit 1 will be described by using calculation formulas.

First, the wirelessly-received RF signal $S_{IN}$ is expressed as an Expression (1) below. Note that fc is a center frequency of the RF signal $S_{IN}$; I is an imaginary unit; t is a time; r(t) is an amplitude component of a modulation signal at a time t (a value of the envelope signal r at the time t); and $\theta(t)$ is a phase component of the modulation signal at the time (t).

[Expression 1]

$$S_{IN} = r(t) \cdot e^{i\theta(t)} \cdot e^{i2\pi f_c t} \quad (1)$$

Next, when the effect of the binarization is omitted, the amplitude signal Dr, which expresses the amplitude component of the RF signal $S_{IN}$ (envelope component) as a binary value, is expressed as an Expression (2) below.

[Expression 2]

$$Dr \approx r(t) \quad (2)$$

Further, when the effect of the binarization is omitted, the phase signal Do, which expresses the phase component of the RF signal $S_{IN}$ as a binary value, is expressed as an Expression (3) below.

[Expression 3]

$$D_\theta \approx e^{i\theta(t)} \cdot e^{i2\pi f_c t} \quad (3)$$

Based on the Expressions (2) and (3), when the effect of the binarization is omitted, the digital RF signal $D_{OUT}$, which is the result of the multiplication of the amplitude signal Dr by the phase signal $D_\theta$ is expressed an Expression (4) below.

[Expression 4]

$$\begin{aligned} D_{OUT} &= D_r \cdot D_\theta \\ &\approx r(t) \cdot e^{i\theta(t)} \cdot e^{i2\pi f_c t} \end{aligned} \quad (4)$$

As is obvious from Expression (4), the digital RF signal $D_{OUT}$ generated by the receiving circuit 1 contains information of the analog RF signal $S_{IN}$ wirelessly received by the receiving circuit 1.

Thus, the receiving circuit 1 according to this embodiment extracts and binarizes an amplitude component and a phase component of the wirelessly-received analog RF signal $S_{IN}$, and then generates a digitalized received signal (digital RF signal) $D_{OUT}$ based on the binarized amplitude component signal (amplitude signal Dr) and the phase component signal (phase signal Do).

Note that the receiving circuit 1 according to this embodiment does not need to be equipped with a mixer, a local oscillator, etc. when converting the analog RF signal into a digital signal. Further, the receiving circuit 1 does not need to be equipped with a multi-bit AD converter either. Therefore, the receiving circuit 1 can prevent an increase in a circuit size. Further, the receiving circuit 1 can also prevent an increase of the power consumption. This is effective for a radio communication system in which an MIMO technique, especially a Massive-MIMO technique is adopted.

Especially in recent years, an AD converter mounted in a receiving circuit has been required to operate at a higher speed since a signal band is becoming wider and wider. This affects an increase in power consumption. For the above reason, the receiving circuit 1, which does not need to be equipped with a multi-bit AD converter, can effectively prevent an increase in the power consumption.

Further, in the receiving circuit 1 according to this embodiment, the envelope signal generating unit 11 removes high-frequency components included in the output signal (voltage signal in proportion to the amplitude of the RF signal $S_{IN}$) of the detector 111 and lets only the envelope component, which changes slowly, pass therethrough. For the reason explained above, the amplitude signal generating unit 13 can modulate the envelope signal r while maintaining high SN characteristics even at low sampling frequencies compared to the case where the RF signal $S_{IN}$ is directly modulated.

For example, when an RF signal $S_{IN}$ having a center frequency of 5 GHz and a signal band width of 100 MHz is received under a condition that an OSR (Over Sampling Ratio) is equal to 10, a sampling frequency is 50 GHz in the case where the RF signal $S_{IN}$ is directly modulated. In contrast to this, the sampling frequency may be about 1 GHz in the case where the envelope signal r is modulated.

Further, the receiving circuit 1 according to this embodiment is not equipped with analog processing circuits such as a mixer and a local oscillator, and is mostly formed by using digital circuits. Therefore, for example, when the receiving circuit 1 is applied to a radio communication system in which a Massive-MIMO technique is adopted, it is easy to correct, for example, variations in delay times between a plurality of receiving circuits.

Further, since the receiving circuit 1 according to this embodiment needs to transmit only two kinds of binarized signals (amplitude signal Dr and phase signal Do) to a digital processing circuit disposed at the subsequent stage, the wiring can be simple. Thus, an increase in a circuit size and an increase in power consumption can be prevented.

Note that it is also considered that miniaturization and simplification of a circuit can be achieved by directly carrying out AD conversion of a wirelessly-received RF signal without using a mixer or a local oscillator. However, in this case, the AD converter needs to convert the analog RF signal in the order of GHz band into a digital signal and therefore it needs to operate at a very high-speed sampling rate. Further, power consumption will be increased with the increase in the sampling rate. In contrast to this, the receiving circuit according to this embodiment does not need to be equipped with a multi-bit AD converter. Further, the amplitude signal generating unit needs only to modulate the envelope signal r, from which high-frequency components have been removed by the filter and hence which changes slowly. Therefore, it can prevent an increase of power consumption.

Next, a specific configuration example of the receiving circuit 1 will be described.

(First Specific Configuration Example of Receiving Circuit 1)

Figure 6:
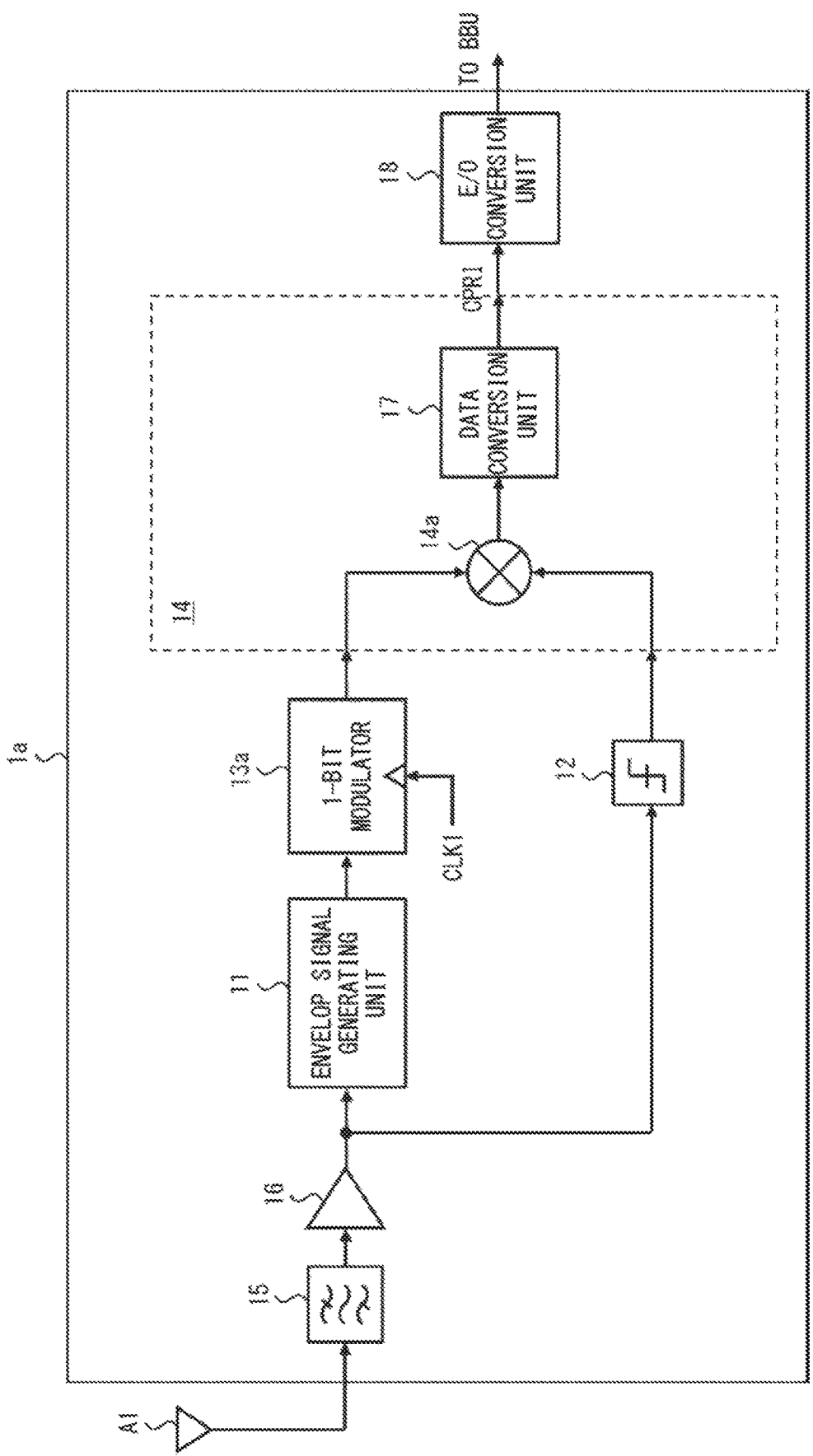
FIG. 6 is a block diagram showing a first specific configuration example of the receiving circuit shown in FIG. 1.

FIG. 6 is a block diagram showing a first specific configuration example of the receiving circuit 1 as a receiving circuit 1a. As the receiving circuit 1a, a more detailed configuration in the case where the receiving circuit 1 is used as a radio unit in a radio base station is shown.

As shown in FIG. 6, the receiving circuit 1a includes the envelope signal generating unit 11, the phase signal generating unit 12, a 1-bit modulator 13a, which is a specific example of the amplitude signal generating unit 13, a multiplier 14a, which is a specific example of the digital RF signal generating unit 14, and a data conversion unit 17. In addition, the receiving circuit 1a also includes a bandpass filter 15, a low noise amplifier 16, and an E/O conversion unit 18. Further, an antenna A1 is shown in FIG. 6 as well.

The bandpass filter 15 lets a desired frequency band of the RF signal $S_{IN}$, which has been wirelessly received through the antenna A1 from the outside, pass therethrough. The low noise amplifier 16 amplifies the RF signal $S_{IN}$ which has passed through the bandpass filter 15. The generations of the amplitude signal Dr by the envelope signal generating unit 11 and the 1-bit modulator 13a and the phase signal $D_\theta$ by the phase signal generating unit 12 are performed by using the RF signal $S_{IN}$ amplified by the low noise amplifier 16.

The data conversion unit 17 converts the digital RF signal $D_{OUT}$ output from the multiplier 14a into a baseband signal or an IF signal by performing down-converting, filtering, down-sampling, etc. for the digital RF signal $D_{OUT}$. In this example, the data conversion unit 17 converts the digital RF signal $D_{OUT}$ into a baseband signal, and then converts the baseband signal into a signal in conformity to CPRI standards (CPRI signal).

The E/O conversion unit 18 converts the CPRI signal output from the data conversion unit 17 into an optical signal. This optical signal is transmitted to an external master station (BBU; Base Band Unit) through an optical cable which is not shown.

Note that because the multiplier 14a and the data conversion unit 17 forming the digital RF signal generating unit 14 process digital signals, they may be formed on another semiconductor integrated circuit instead of the one used for the envelope signal generating unit 11, the phase signal generating unit 12, the 1-bit modulator 13a, etc. which process analog signals. The digital RF signal generating unit 14, for example, can be formed by using an FPGA. In other words, the multiplier 14a and/or the data conversion unit 17, for example, are the digital processing circuits formed by a combination of a plurality of logic gates arranged on the FPGA. Since the receiving circuit 1a needs to transmit only two kinds of binarized signals (amplitude signal Dr and phase signal $D_\theta$) to the digital processing circuit such as the multiplier 14a or the data conversion unit 17 formed on integrated circuits such as the FPGA, the wiring can be simple. Thus, an increase in a circuit size and an increase in power consumption can be prevented.

(Second Specific Configuration Example of Receiving Circuit 1)

Figure 7:
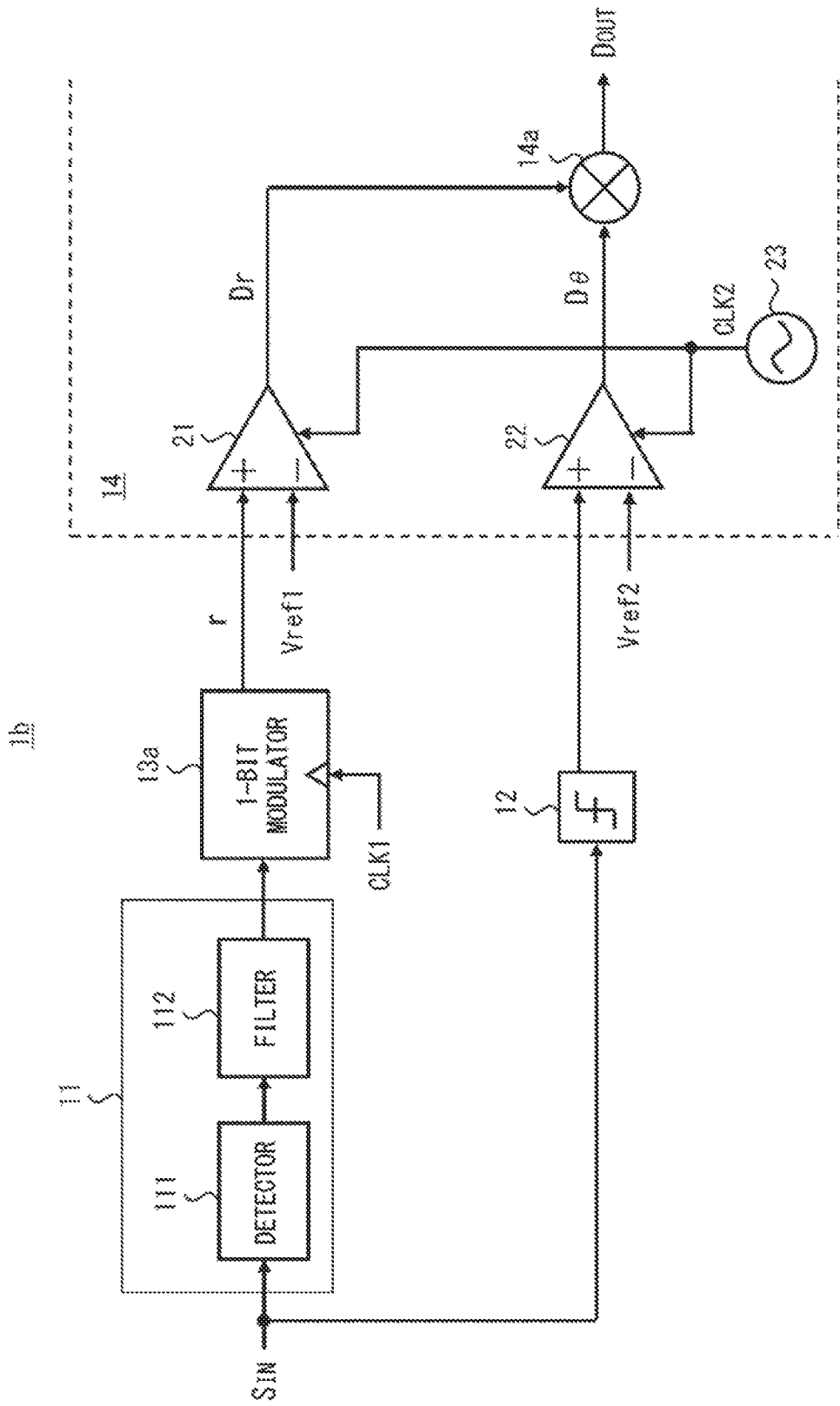
FIG. 7 is a block diagram showing a second specific configuration example of the receiving circuit shown in FIG. 1.

FIG. 7 is a block diagram showing a second specific configuration example of the receiving circuit 1 as a receiving circuit 1b. FIG. 7 shows an interface circuit forming the digital RF signal generating unit 14 more specifically, compared to the receiving circuit 1, as the receiving circuit 1b.

Differential input circuits 21 and 22 are provided in the digital RF signal generating unit 14 as input interface circuits. Further, a clock generating source 23, which generates a clock signal CLK2 for the differential input circuits 21 and 22, is provided in the digital RF signal generating unit 14.

The differential input circuit 21 synchronizes with the clock signal CLK2 supplied from the clock generating source 23, and compares the amplitude signal Dr output from the 1-bit modulator 13a, which is a specific example of the amplitude signal generating unit 13, and a reference voltage Vref1. For example, when a voltage range of the amplitude signal Dr output from the 1-bit modulator 13a is between a voltage $V_{rH}$ and a ground voltage GND, the reference voltage Vref1 is an intermediate voltage between the voltage $V_{rH}$ and the ground voltage GND. The differential input circuit 21 outputs a value "1" when a voltage of the amplitude signal Dr output from the 1-bit modulator 13a is higher than the reference voltage Vref1, and outputs a value "0" when the voltage of the amplitude signal Dr output from the 1-bit modulator 13a is lower than the reference voltage Vref1. Therefore, the differential input circuit 21 determines, from the amplitude signal Dr, its logical value and outputs the determined logical value.

The differential input circuit 22 synchronizes with the clock signal CLK2 supplied from the clock generating source 23, and compares the phase signal $D_\theta$ generated by the phase signal generating unit 12 and a reference voltage Vref2. For example, when a voltage range of the phase signal $D_\theta$ output from the phase signal generating unit 12 is between $V_\theta$ and $-V_\theta$, the reference voltage Vref2 is the ground voltage GND. The differential input circuit 22 outputs a value "1" when a voltage of the phase signal $D_\theta$ output from the phase signal generating unit 12 is higher than the reference voltage Vref2, and outputs a value "−1" when the voltage of the phase signal $D_\theta$ output from the phase signal generating unit 12 is lower than the reference voltage Vref2.

Therefore, the differential input circuit 22 determines, from the phase signal $D_\theta$, its logical value and outputs the determined logical value.

Then, the multiplier 14a, which is a specific example of the digital RF signal generating unit 14, multiplies the amplitude signal Dr output from the differential input circuit 21 and the phase signal $D_\theta$ output from the differential input circuit 22, and outputs the digital RF signal $D_{OUT}$. Other configurations and operations of the receiving circuit 1b are the same as those of the receiving circuit 1, thus their explanations are omitted. Further, in FIG. 7, the data conversion unit 17 forming the digital RF signal generating unit 14 is omitted to be shown since it is the same as FIG. 6.

(Third Specific Configuration Example of Receiving Circuit 1)

Figure 8:
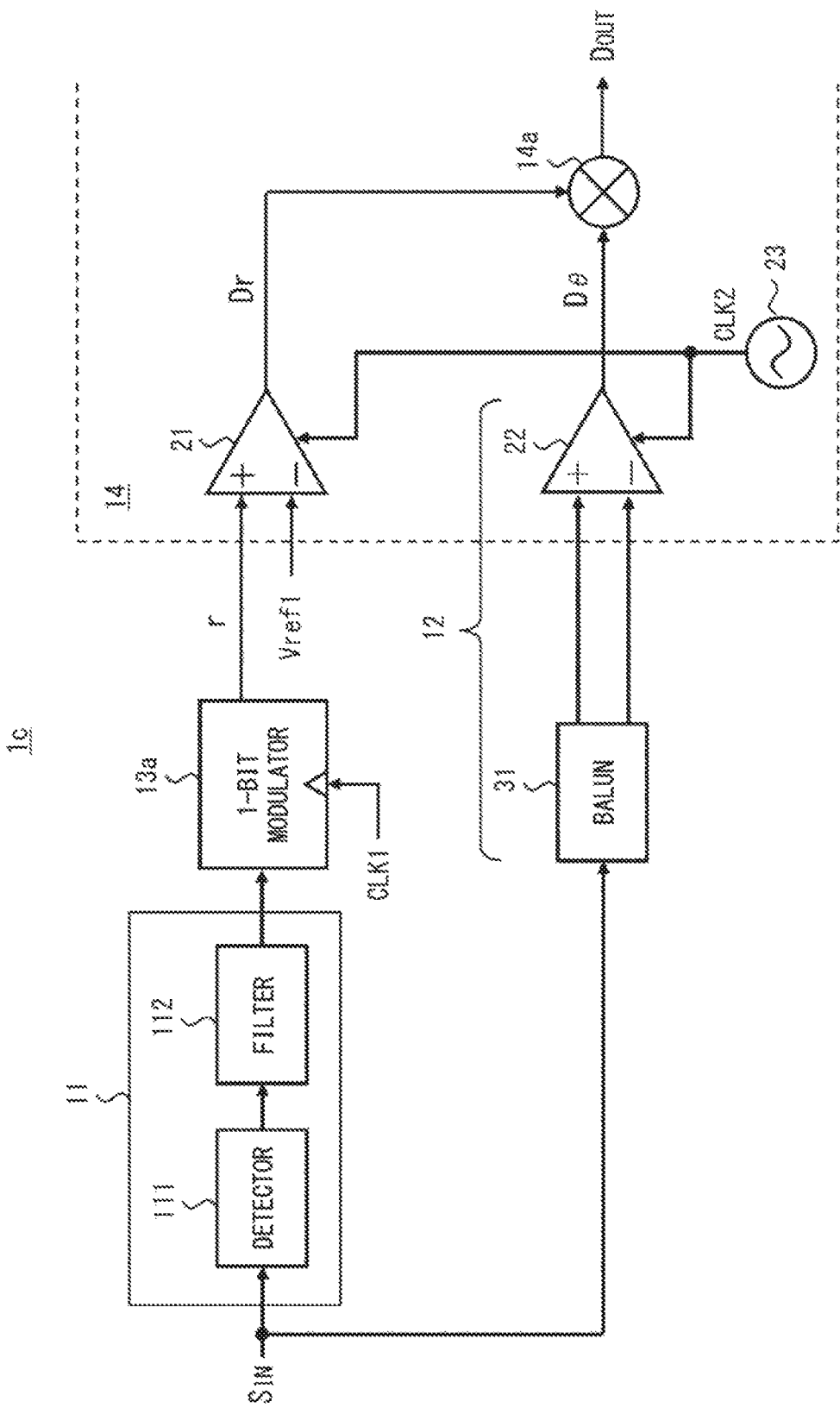
FIG. 8 is a block diagram showing a third specific configuration example of the receiving circuit shown in FIG. 1.

FIG. 8 is a block diagram showing a third specific configuration example of the receiving circuit 1 as a receiving circuit 1c. The receiving circuit 1c differs from the receiving circuit 1b in the configuration of the phase signal generating unit 12.

Referring to FIG. 8, the phase signal generating unit 12 includes a balun 31 which is newly provided and the differential input circuit 22. The balun 31 converts the RF signal $S_{IN}$ which is a single-end signal into differential signals. The differential input circuit 22 is used as a comparator, and compares one of the differential signals of the RF signal $S_{IN}$ output from the balun 31 with the other differential signal and outputs the comparison result as the phase signal $D_\theta$.

Figure 9:
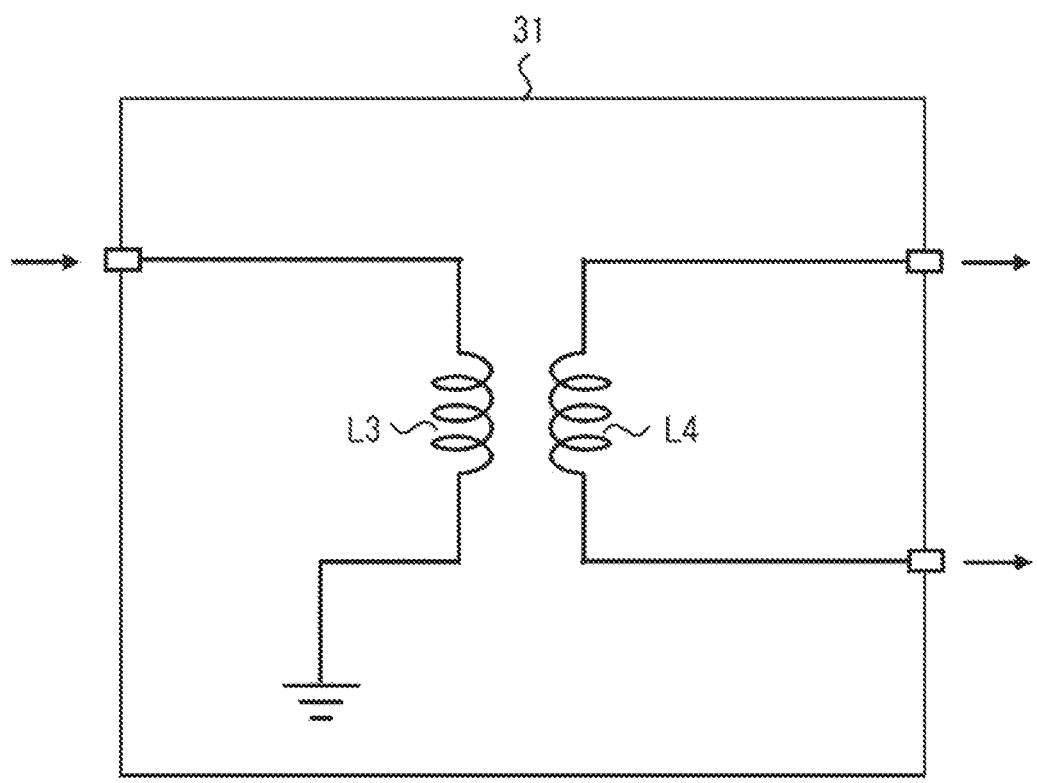
FIG. 9 shows a configuration example of a balun provided in the receiving circuit shown in FIG. 8.

FIG. 9 shows a specific configuration example of the balun 31.

Referring to FIG. 9, the balun 31 includes coils L3 and L4 forming a transformer. One end of the coil L3 is connected to the input terminal of the balun 31 and the other end of the coil L3 is connected to the ground voltage terminal GND. One end and the other end of the coil L4 are connected to one and the other of differential output terminals, respectively. The balun 31 converts the RF signal $S_{IN}$, which is a single-end signal, into magnetism by using the coil L3. Further, it converts the magnetism into differential signals by using the coil L4. Note that the configuration of the balun 31 is not limited to the one shown in FIG. 9 and can be modified as appropriate to other configurations having an equivalent function Other configurations and operations of the receiving circuit 1c are similar to those of the receiving circuit 1b, thus their explanations are omitted.

The receiving circuit 1c uses the differential input circuit 21 provided in the digital RF signal generating unit 14 as a part of the phase signal generating unit 12. Therefore, the receiving circuit 1c can prevent an increase in a circuit size.

(Fourth Specific Configuration Example of Receiving Circuit 1)

Figure 10:
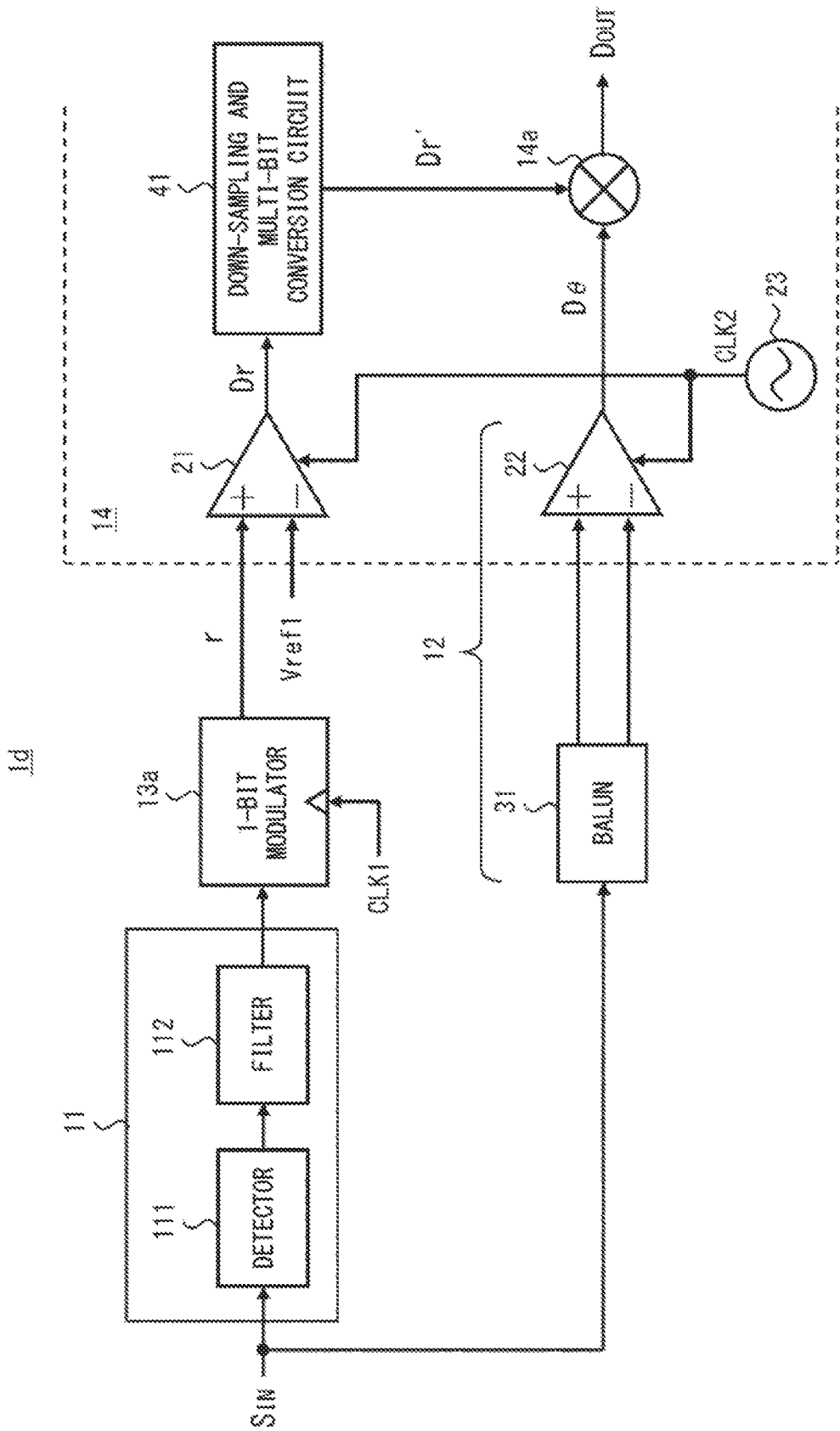
FIG. 10 is a block diagram showing a fourth specific configuration example of the receiving circuit shown in FIG. 1.

FIG. 10 is a block diagram showing a fourth specific configuration example of the receiving circuit 1 as a receiving circuit 1d. Compared to the receiving circuit 1c, a down-sampling and multi-bit conversion circuit 41, which is a part of the digital processing circuit provided at the subsequent stage of the multiplier 14a, is provided between the differential input circuit 21 and the multiplier 14a in the receiving circuit 1d.

The down-sampling and multi-bit conversion circuit 41 performs down-sampling and conversion into multi-bits for the amplitude signal Dr output from the differential input circuit 21, and outputs the resultant signal as an amplitude signal Dr'. If unnecessary signals are included in the amplitude signal Dr, the down-sampling and conversion into multi-bits are performed while performing filtering as appropriate. Then, the multiplier 14a multiplies the digital amplitude signal Dr' and the digital phase signal $D_\theta$, and outputs the digital RF signal $D_{OUT}$.

Other configurations and operations of the receiving circuit 1d are similar to those of the receiving circuit 1c, thus their explanations are omitted.

Thus, even if a part of the digital processing circuit is provided at the preceding stage of the multiplier 14a, the receiving circuit 1d provides effects equivalent to those of the receiving circuit 1c.

(Fifth Specific Configuration Example of Receiving Circuit 1)

Figure 11:
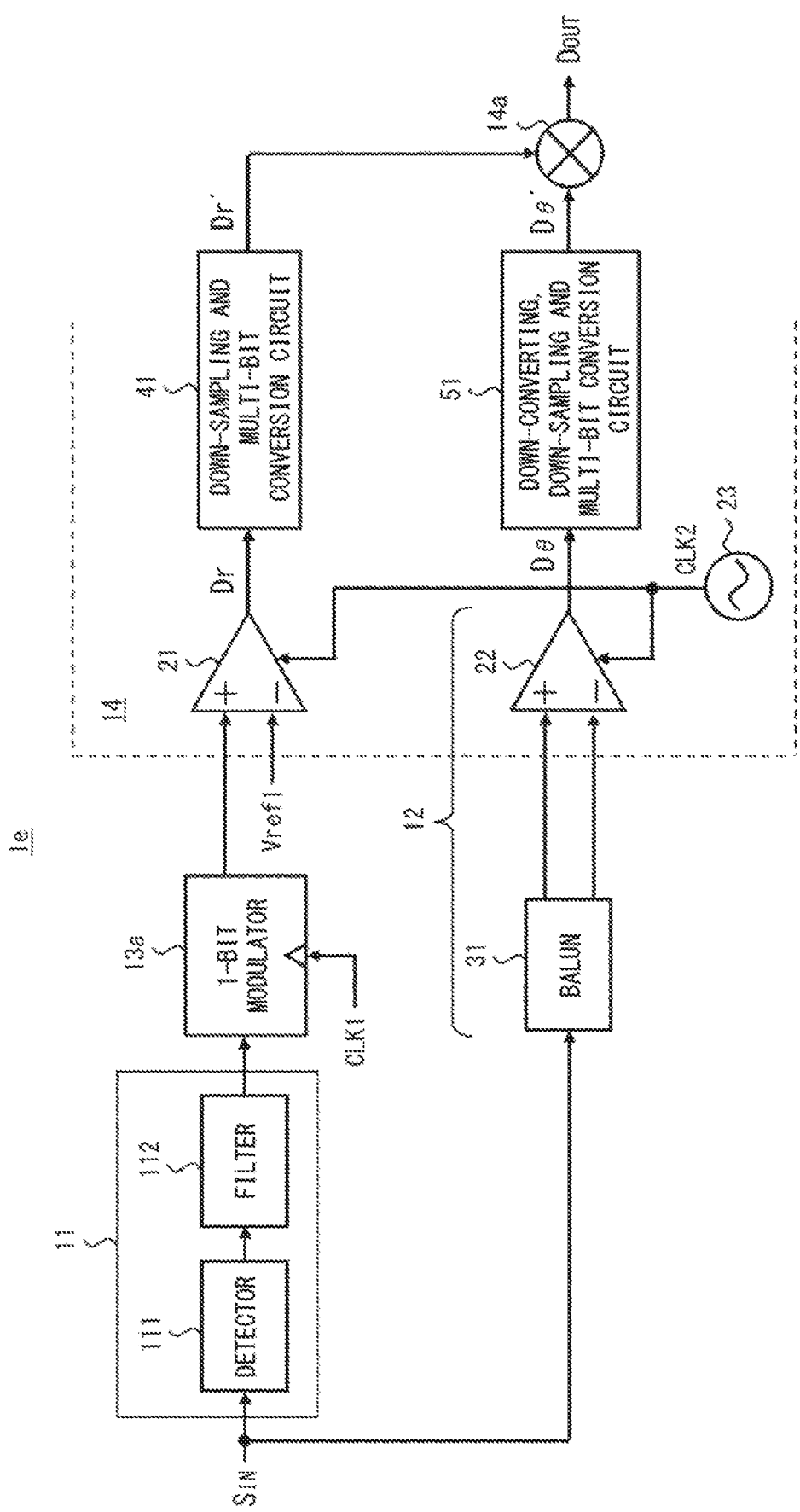
FIG. 11 is a block diagram showing a fifth specific configuration example of the receiving circuit shown in FIG. 1.

FIG. 11 is a block diagram showing a fifth specific configuration example of the receiving circuit 1 as a receiving circuit 1e. Compared to the receiving circuit 1d, a down-converting/down-sampling and multi-bit conversion circuit 51, which is a part of the digital processing circuit provided at the subsequent stage of the multiplier 14a, is provided between the differential input circuit 22 and the multiplier 14a in the receiving circuit 1e.

The down-converting/down-sampling and multi-bit conversion circuit 51 performs down-converting, down-sampling and conversion into multi-bits for the phase signal $D_\theta$ output from the differential input circuit 22, and outputs the resultant signal as an phase signal $D_\theta$'. When unnecessary signals are included in the phase signal $D_\theta$, the down-sampling and conversion into multi-bits are performed while performing filtering as appropriate. Then, the multiplier 14a multiplies the digital amplitude signal Dr' and the digital phase signal $D_\theta$', and outputs the digital RF signal $D_{OUT}$. For example, when the phase signal $D_\theta$ is down-converted to a baseband in the down-converting/down-sampling and multi-bit conversion circuit 51, the obtained digital RF signal $D_{OUT}$ is a received signal in the baseband.

Other configurations and operations of the receiving circuit 1e are similar to those of the receiving circuit 1d, thus their explanations are omitted.

Thus, even if a part of the digital processing circuit is provided at the preceding stage of the multiplier 14a, the receiving circuit 1e provides effects equivalent to those of the receiving circuit 1d.

(Sixth Specific Configuration Example of Receiving Circuit 1)

Figure 12:
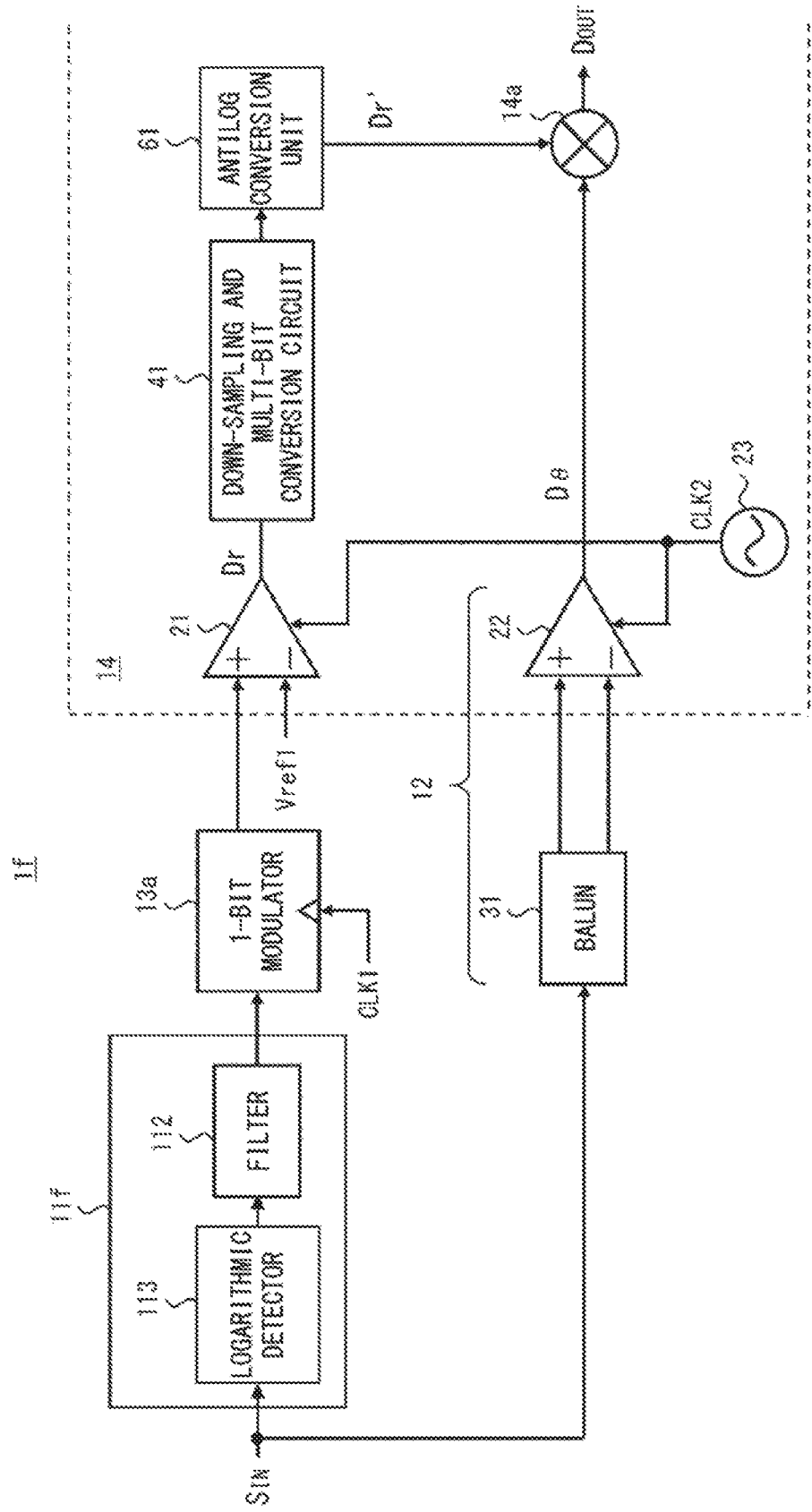
FIG. 12 is a block diagram showing a sixth specific configuration example of the receiving circuit shown in FIG. 1.

FIG. 12 is a block diagram showing a sixth specific configuration example of the receiving circuit 1 as a receiving circuit 1f. Compared to the receiving circuit 1d, the receiving circuit 1f includes an envelope signal generating unit 11f in place of the envelope signal generating unit 11. In addition, it includes an antilog conversion unit 61 between the down-sampling and multi-bit conversion circuit 41 and the multiplier 14a.

Compared to the envelope signal generating unit 11, the envelope signal generating unit 11f includes a logarithmic detector 113 in place of the detector 111. The logarithmic detector 113 generates a voltage signal in proportion to the logarithmic of the amplitude of the RF signal $S_{IN}$ in the envelope signal generating unit 11f. The filter 112 lets only an envelope component of the voltage signal output from the logarithmic detector 113 pass therethrough while removing unnecessary components included in the voltage signal, and outputs the passing envelop component as an envelope signal r. However, the filter 112 can be omitted when a necessary envelope signal r is obtained by a high-frequency component eliminating characteristic of the logarithmic detector 113.

Further, the antilog conversion unit 61 converts the logarithmic amplitude signal Dr', which is output from the down-sampling and multi-bit conversion circuit 41, into the antilogarithm and outputs the antilog amplitude signal Dr'. Furthermore, the multiplier 14a multiplies the amplitude signal Dr', which has been converted into the antilog, and the phase signal $D_\theta$, and outputs the digital RF signal $D_{OUT}$.

Other configurations and operations of the receiving circuit 1f are similar to those of the receiving circuit 1d, thus their explanations are omitted.

Thus, the receiving circuit 1f can widen its dynamic range by handling the amplitude component of the RF signal $S_{IN}$ as the logarithm thereof.

(Seventh Specific Configuration Example of Receiving Circuit 1)

Figure 13:
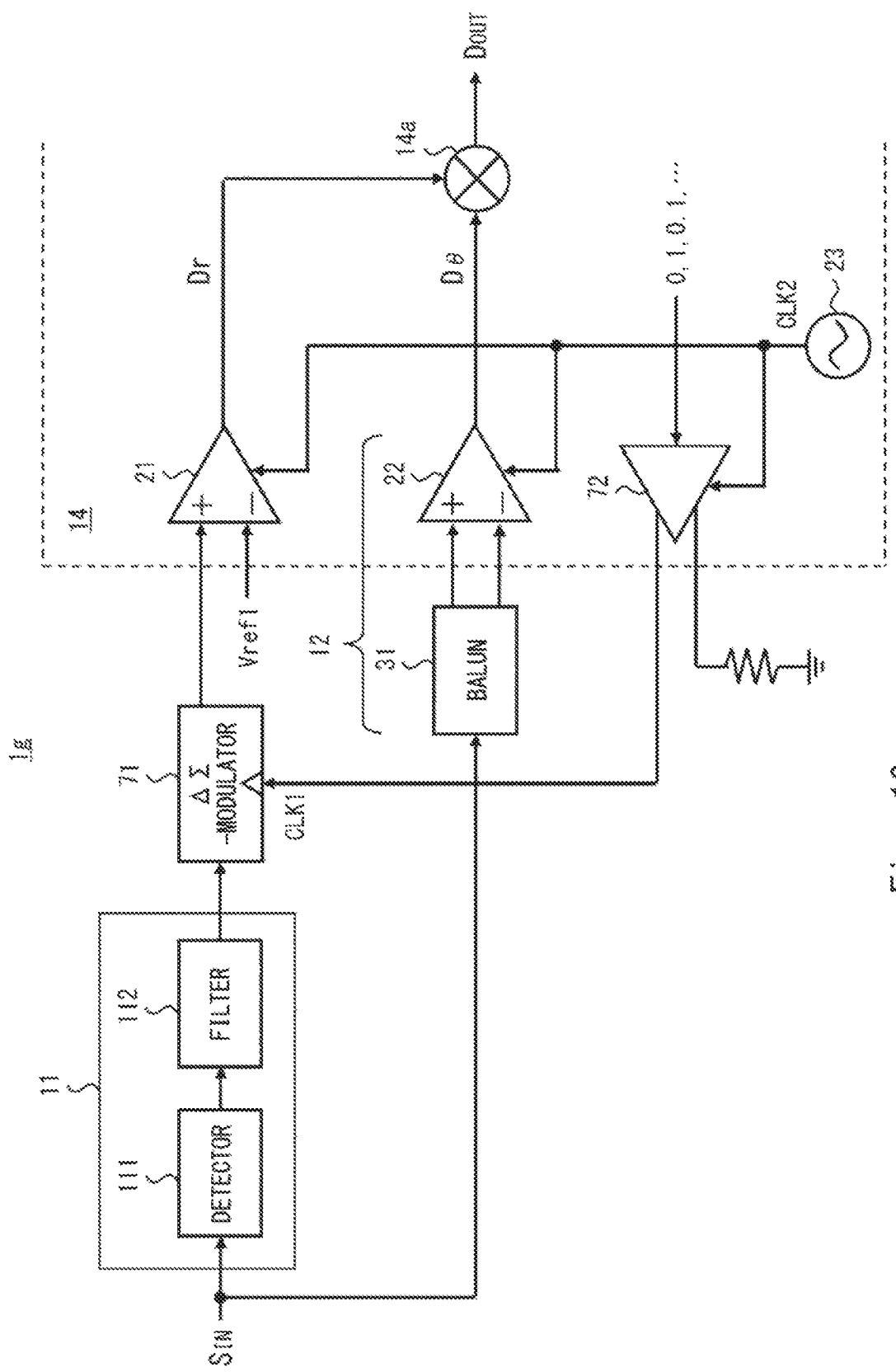
FIG. 13 is a block diagram showing a seventh specific configuration example of the receiving circuit shown in FIG. 1.

FIG. 13 is a block diagram showing a seventh specific configuration example of the receiving circuit 1 as a receiving circuit 1g. Compared to the receiving circuit 1c, a ΔΣ-modulator 71 is used as the 1-bit modulator 13a in the receiving circuit 1g.

A differential output circuit 72 is also provided in the digital RF signal generating unit 14 as an output interface circuit. The differential output circuit 72 captures an input signal whose logical value is switched at the same cycle as the clock signal CLK2 supplied from the clock generating source 23, in synchronization with the clock signal CLK2, and outputs the captured input signal as the clock signal CLK1. Thus, the differential output circuit 72 outputs the clock signal CLK1, whose cycle is twice as long as the clock signal CLK2 supplied to the differential input circuits 21 and 22, to the outside of the digital RF signal generating unit 14. This clock signal CLK1 is supplied to the ΔΣ-modulator 71.

The ΔΣ-modulator 71 ΔΣ-modulates an envelope signal r at each rise and fall of the clock signal CLK1 and outputs a binarized digital amplitude signal (ΔΣ modulated signal) Dr. Then, the multiplier 14a multiplies the amplitude signal Dr and the phase signal $D_\theta$, and outputs the digital RF signal $D_{OUT}$.

Other configurations and operations of the receiving circuit 1g are similar to those of the receiving circuit 1c, thus their explanations are omitted.

Note that the ΔΣ-modulator 71 can also be used as the 1-bit modulator 13a in the receiving circuits 1b to 1f or the like.

(Eighth Specific Configuration Example of Receiving Circuit 1)

Figure 14:
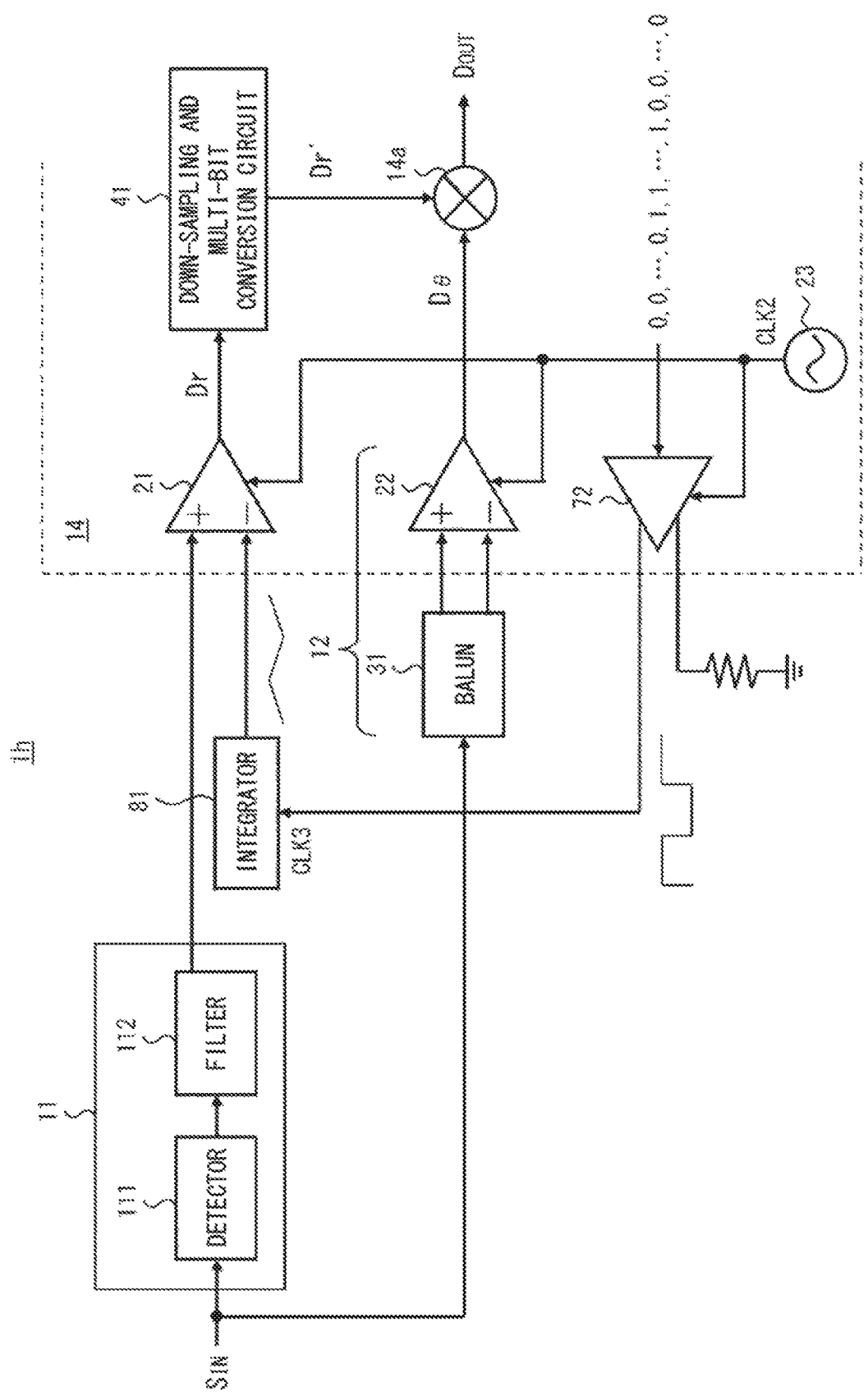
FIG. 14 is a block diagram showing an eighth specific configuration example of the receiving circuit shown in FIG. 1.

FIG. 14 is a block diagram showing an eighth specific configuration example of the receiving circuit 1 as a receiving circuit 1h. Compared to the receiving circuit 1d, a slope AD converter consisting of an integrator 81 and the differential input circuit 21 is used as the 1-bit modulator 13a in the receiving circuit 1h.

A differential output circuit 72 is also provided in the digital RF signal generating unit 14 as an output interface circuit. The differential output circuit 72 captures an input signal whose logical value is switched at a cycle longer than that of the clock signal CLK2 supplied from the clock generating source 23, in synchronization with the clock signal CLK2, and outputs the captured input signal as the clock signal CLK3. Thus, the differential output circuit 72 outputs the clock signal CLK3, whose cycle is longer than that of the clock signal CLK2 supplied to the differential input circuits 21 and 22, to the outside of the digital RF signal generating unit 14. This clock signal CLK3 is supplied to the integrator 81.

The integrator 81 outputs a triangular wave having the same cycle as the clock signal CLK3 (in other words, having a cycle longer than that of the clock signal CLK2).

Figure 15:
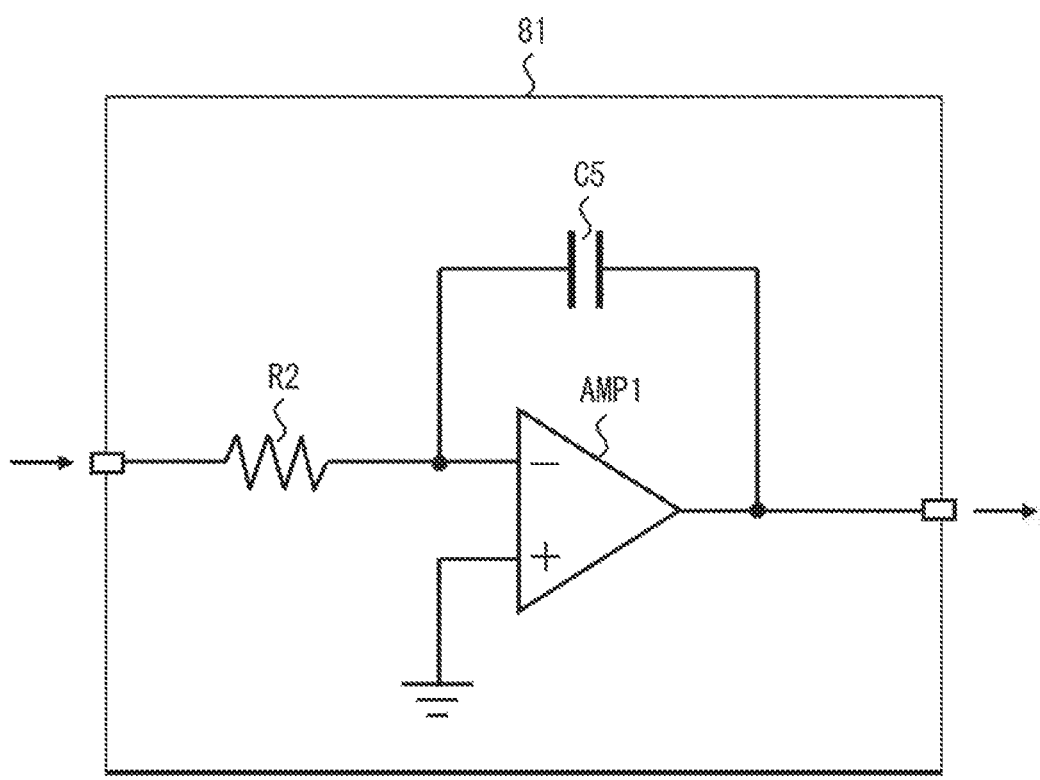
FIG. 15 shows a configuration example of an integrator provided in the receiving circuit shown in FIG. 14.

FIG. 15 shows a specific configuration example of the integrator 81.

Referring to FIG. 15, the integrator 81 includes an operational amplifier AMP1, a resistive element R2 and a capacitive element C5. The resistive element R2 is disposed between the input terminal of the integrator 81 and the inverting input terminal of the operational amplifier AMP1. The capacitive element C5 is disposed between the output terminal and the inverting input terminal of the operational amplifier AMP1. The non-inverting input terminal of the operational amplifier AMP1 is connected to the ground voltage terminal GND. The output terminal of the operational amplifier AMP1 is connected to the output terminal of the integrator 81. Note that the configuration of the integrator 81 is not limited to the one shown in FIG. 15 and can be modified as appropriate to other configurations having an equivalent function.

The differential input circuit 21 compares the envelope signal r generated by the envelope signal generating unit 11 and the triangular wave output from the integrator 81 in synchronization with the clock signal CLK2, and outputs a binarized digital amplitude signal Dr.

For example, the differential input circuit 21 outputs the amplitude signal Dr having a value "1" when a voltage of the envelope signal r is higher than that of the triangular wave, and outputs the amplitude signal Dr having a value "0" when the voltage of the envelope signal r is equal to or lower than that of the triangular wave.

Note that the down-sampling and multi-bit conversion circuit 41, for example, calculates the sum of values of the amplitude signal Dr output from the differential input circuit 21 in synchronization with the clock signal CLK2 for each cycle of the triangular wave (i.e., for each cycle of the clock signal CLK3). Then, the down-sampling and multi-bit conversion circuit 41 outputs a value of the sum as the amplitude signal Dr'. Thus, the amplitude component of the RF signal $S_{IN}$ can be obtained.

Then, the multiplier 14a multiplies the amplitude signal Dr', which has been down-sampled and converted into multi-bits, and the phase signal $D_\theta$, and outputs the digital RF signal $D_{OUT}$.

Other configurations and operations of the receiving circuit 1h are similar to those of the receiving circuit 1d, thus their explanations are omitted.

Thus, the receiving circuit 1h uses the slope AD converter consisting of the integrator 81 and the differential input circuit 21 as the 1-bit modulator 13a. Therefore, the receiving circuit 1h can prevent an increase in a circuit size as compared with a case of using the ΔΣ-modulator 71. Further, as a result, an increase in power consumption can be prevented.

Note that the slope AD converter consisting of the integrator 81 and the differential input circuit 21 can also be used as the 1-bit modulator 13a in the receiving circuits 1b to 1f or the like.

(Ninth Specific Configuration Example of Receiving Circuit 1)

Figure 16:
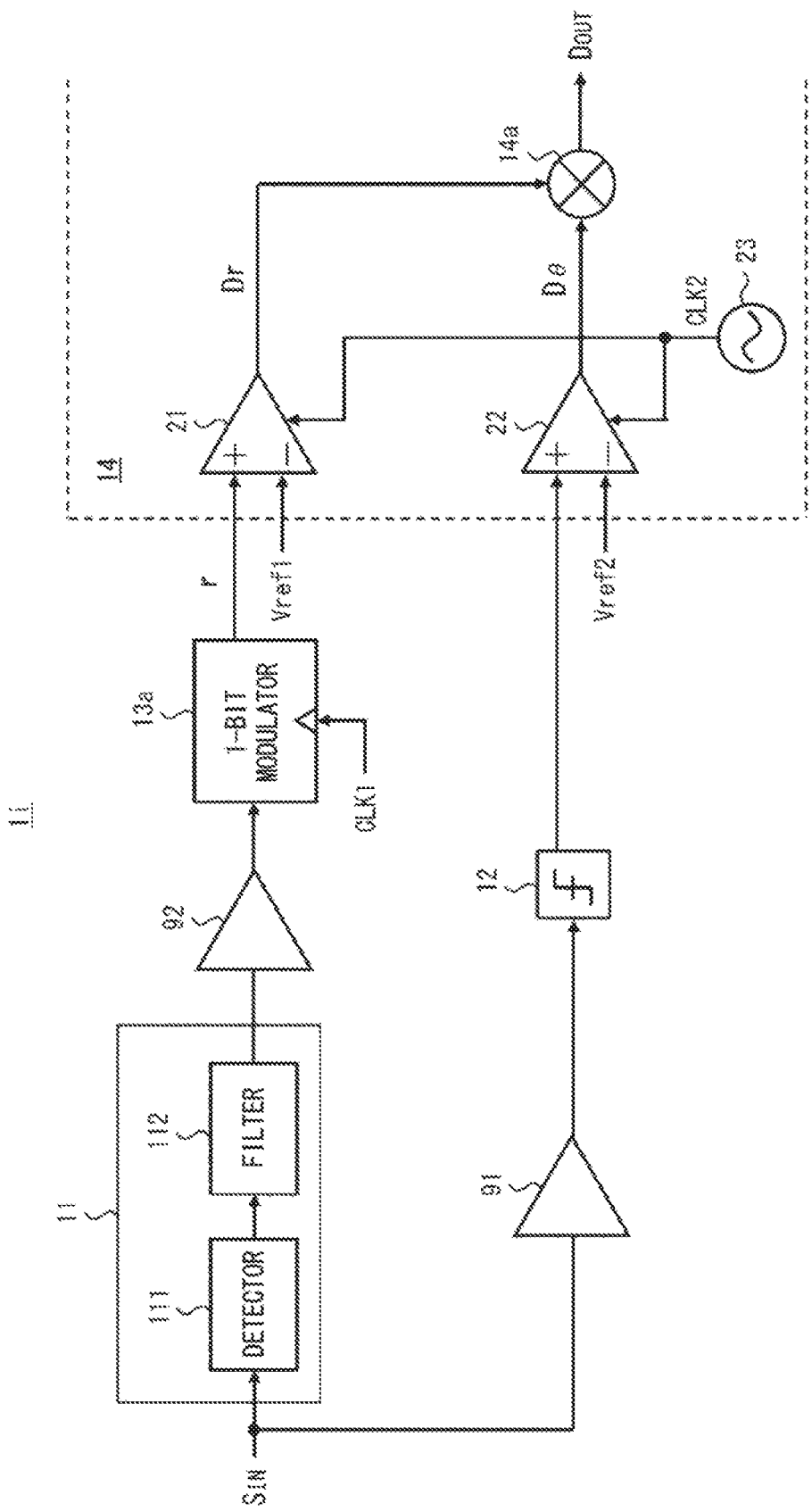
FIG. 16 is a block diagram showing a ninth specific configuration example of the receiving circuit shown in FIG. 1.

FIG. 16 is a block diagram showing a ninth specific configuration example of the receiving circuit 1 as a receiving circuit 1i. Compared to the receiving circuit 1b, the receiving circuit 1i further includes a signal amplifier 91 at the preceding stage of the phase signal generating unit 12. In addition, the receiving circuit 1i includes a signal amplifier 92 at the preceding stage of the 1-bit modulator 13a.

The signal amplifier 91, for example, further amplifies the RF signal $S_{IN}$ amplified by the low noise amplifier 16 (not shown in FIG. 16) and outputs the amplified RF signal $S_{IN}$. Thus, the phase signal generating unit 12 can easily compare the RF signal $S_{IN}$ and the reference voltage Vref2, and therefore accurately output the phase signal $D_θ$. This signal amplifier 91 may be a saturated amplifier or a gain variable amplifier. When a saturated amplifier is used, the RF signal $S_{IN}$ is output after its waveform is shaped into a rectangular shape or a similar shape. In the case of the gain variable amplifier, the RF signal $S_{IN}$ is used after its gain is changed to an appropriate gain based on the output level of the envelop signal generating unit 11 and/or the reception result of the receiving circuit.

The signal amplifier 92 further amplifies, for example, the envelope signal generated by the envelope signal generating unit 11 and outputs the amplified envelope signal. By doing so, even when the envelope signal is weak, the 1-bit modulator 13a can output the amplitude signal Dr more accurately. This signal amplifier 92 may be a gain variable amplifier. In the case of the gain variable amplifier, the RF signal $S_{IN}$ is used after its gain is changed to an appropriate gain based on the output level of the envelop signal generating unit 11 and/or the reception result of the receiving circuit. As a result, an advantageous effect equivalent to an improvement in the dynamic range of the 1-bit modulator 13a can be obtained.

Only one of the signal amplifiers 91 and 92 may be provided. Note that each of the receiving circuits 1c to 1h can also further include the signal amplifier 91 at the preceding stage of the phase signal generating unit 12 and/or the signal amplifier 92 at the preceding stage of the 1-bit modulator 13a.

Features of receiving circuits according to the above-described embodiments may be used while being combined with one another without departing from the spirit.

The whole or part of the embodiments disclosed above can be described as, but not limited to, the following supplementary notes.

(Supplementary Note 1)
A receiving circuit comprising:
envelope signal generating means for outputting an envelope signal of a received RF signal;
amplitude signal generating means for binarizing the envelope signal which is captured in synchronization with a reference clock signal and outputting the binarized envelope signal as an amplitude signal;
a balun configured to convert the RF signal which is a single-end signal into differential signals; and
digital RF signal generating means for outputting a digital RF signal based on a phase signal and the amplitude signal, the phase signal expressing a phase component of the RF signal as a binary value, the phase component of the RF signal being obtained by comparing one of the differential signals with the other differential signal.

(Supplementary Note 2)
The receiving circuit described in Supplementary note 1, wherein the envelope signal generating means comprises:
a detector configured to output a voltage signal in proportion to an amplitude of the RF signal; and
a filter configured to let an envelope component included in the voltage signal pass therethrough and output the passing envelope component as the envelope signal.

(Supplementary Note 3)
The receiving circuit described in Supplementary note 1, wherein the envelope signal generating means comprises:
a detector configured to output a voltage signal in proportion to a logarithm of an amplitude of the RF signal; and
a filter configured to let an envelope component included in the voltage signal pass therethrough and output the passing envelope component as the envelope signal.

(Supplementary Note 4)
The receiving circuit described in any one of Supplementary notes 1 to 3, wherein the reference clock signal is a different signal from the phase signal.

(Supplementary Note 5)
The receiving circuit described in any one of Supplementary notes 1 to 4, wherein the reference clock signal is a signal whose voltage level is switched at a regular interval.

(Supplementary Note 6)
The receiving circuit described in any one of Supplementary notes 1 to 5, wherein the amplitude signal generating means is a 1-bit modulator.

(Supplementary Note 7)
The receiving circuit described in any one of Supplementary notes 1 to 5, wherein the amplitude signal generating means is a $\Delta\Sigma$-modulator.

(Supplementary Note 8)
The receiving circuit described in any one of Supplementary notes 1 to 5, wherein the amplitude signal generating means comprises:
an integrator configured to generate a triangular wave whose cycle is longer than that of the reference clock signal; and
a second differential input circuit configured to compare a potential of the triangular wave and a potential of the envelope signal in synchronization with the reference clock signal and outputs the comparison result as the amplitude signal.

(Supplementary Note 9)
The receiving circuit described in any one of Supplementary notes 1 to 8, wherein the digital RF signal generating means is a multiplier configured to multiply the amplitude signal and the phase signal and outputs the digital RF signal.

(Supplementary Note 10)
A receiving apparatus comprising:
a receiving circuit described in any one of Supplementary notes 1 to 9, configured to generate the digital RF signal from the received RF signal and down-convert the generated digital RF signal into a baseband signal or an IF signal;
an optical cable configured to transmit the baseband signal or the IF signal, which has been converted into optical signals; and
a baseband processing circuit configured to convert the optical signal transmitted through the optical cable into the baseband signal or the IF signal, and processes the converted signal.

REFERENCE SIGNS LIST

1 RECEIVING CIRCUIT
1a-1h RECEIVING CIRCUIT
2 BASEBAND PROCESSING UNIT
11 ENVELOP SIGNAL GENERATING UNIT
11f ENVELOP SIGNAL GENERATING UNIT
12 PHASE SIGNAL GENERATING UNIT
13 AMPLITUDE SIGNAL GENERATING UNIT
13a 1-BIT MODULATOR
14 DIGITAL RF SIGNAL GENERATING UNIT
14a MULTIPLIER
15 BANDPASS FILTER
16 LOW NOISE AMPLIFIER
17 DATA CONVERSION UNIT

18 E/O CONVERSION UNIT
21 DIFFERENTIAL INPUT CIRCUIT
22 DIFFERENTIAL INPUT CIRCUIT
23 CLOCK GENERATING SOURCE
31 BALUN
41 DOWN-SAMPLING AND MULTI-BIT CONVERSION CIRCUIT
51 DOWN-CONVERTING/DOWN-SAMPLING AND MULTI-BIT CONVERSION CIRCUIT
61 ANTILOG CONVERSION UNIT
71 ΔΣ-MODULATOR
72 DIFFERENTIAL OUTPUT CIRCUIT
81 INTEGRATOR
91 SIGNAL AMPLIFIER
92 SIGNAL AMPLIFIER
111 DETECTOR
112 FILTER
113 LOGARITHMIC DETECTOR
A1 ANTENNA
AMP1 AMPLIFIER
C1-C5 CAPACITIVE ELEMENT
D1 DIODE
L1-L4 COIL
R1, R2 RESISTIVE ELEMENT

The invention claimed is:

1. A receiving circuit comprising:
envelope signal generating circuit configured to output an envelope signal of a received RF signal;
amplitude signal generating circuit configured to binarize the envelope signal which is captured in synchronization with a reference clock signal and output the binarized envelope signal as an amplitude signal;
phase signal generating circuit configured to binarize a phase component of the RF signal and output the binarized phase component as a phase signal; and
digital RF signal generating circuit configured to output a digital RF signal based on the amplitude signal and the phase signal.

2. The receiving circuit according to claim 1, wherein the envelope signal generating circuit comprises:
a detector configured to output a voltage signal in proportion to an amplitude of the RF signal; and
a filter configured to let an envelope component included in the voltage signal pass therethrough and output the passing envelope component as the envelope signal.

3. The receiving circuit according to claim 1, wherein the envelope signal generating circuit comprises:
a detector configured to output a voltage signal in proportion to a logarithm of an amplitude of the RF signal; and
a filter configured to let an envelope component included in the voltage signal pass therethrough and output the passing envelope component as the envelope signal.

4. The receiving circuit according to claim 1, wherein the reference clock signal is a different signal from the phase signal.

5. The receiving circuit according to claim 1, wherein the reference clock signal is a signal whose voltage level is switched at a regular interval.

6. The receiving circuit according to claim 1, wherein the phase signal generating circuit is a comparator configured to compare the RF signal with a reference voltage signal and output the comparison result as the phase signal.

7. The receiving circuit according to claim 1, wherein the phase signal generating circuit comprises:
a balun configured to convert the RF signal which is a single-end signal into differential signals; and
a first differential input circuit configured to compare one of the differential signals output from the balun with the other differential signal and output the comparison result as the phase signal.

8. The receiving circuit according to claim 1, wherein the amplitude signal generating circuit is a 1-bit modulator.

9. The receiving circuit according to claim 1, wherein the amplitude signal generating circuit is a ΔΣ-modulator.

10. The receiving circuit according to claim 1, wherein the amplitude signal generating circuit comprises:
an integrator configured to generate a triangular wave whose cycle is longer than that of the reference clock signal; and
a second differential input circuit configured to compare a potential of the triangular wave with a potential of the envelope signal in synchronization with the reference clock signal and output the comparison result as the amplitude signal.

11. The receiving circuit according to claim 1, wherein the digital RF signal generating circuit is a multiplier configured to multiply the amplitude signal by the phase signal and output the digital RF signal.

12. A receiving apparatus comprising:
a receiving circuit according to claim 1, configured to output the digital RF signal from the received RF signal and down-convert the output digital RF signal into a baseband signal or an IF signal;
an optical cable configured to transmit the baseband signal or the IF signal, which has been converted into optical signals; and
a baseband processing circuit configured to convert the optical signal transmitted through the optical cable into the baseband signal or the IF signal, and processes the converted signal.

13. A receiving method comprising:
a step of outputting an envelope signal of a received RF signal;
a step of binarizing the envelope signal which is captured in synchronization with a reference clock signal and outputting the binarized envelope signal as an amplitude signal;
a step of binarizing a phase component of the RF signal and outputting the binarized phase component as a phase signal; and
a step of generating a digital RF signal based on the amplitude signal and the phase signal.

14. The receiving method according to claim 13, wherein the reference clock signal is a different signal from the phase signal.

15. The receiving method according to claim 13, wherein the reference clock signal is a signal whose voltage level is switched at a regular interval.

16. The receiving method according to claim 13, wherein in the step of outputting the amplitude signal, the envelope signal, which is captured in synchronization with the reference clock signal, is ΔΣ-modulated and output as the amplitude signal.

17. The receiving method according to claim 13, wherein a step of the amplitude signal comprises:
a step of generating a triangular wave whose cycle is longer than that of the reference clock signal; and
a step of comparing a potential of the triangular wave and a potential of the envelope signal in synchronization with the reference clock signal and outputting the comparison result as the amplitude signal.

* * * * *

UNITED STATES PATENT AND TRADEMARK OFFICE
CERTIFICATE OF CORRECTION

PATENT NO. : 10,797,742 B2
APPLICATION NO. : 15/780772
DATED : October 6, 2020
INVENTOR(S) : Noriaki Tawa Page 1 of 1

It is certified that error appears in the above-identified patent and that said Letters Patent is hereby corrected as shown below:

In the Specification

Column 5, Description of Embodiments, Line 56; Delete "0($t$)" and insert --$\theta(t)$-- therefor Column 6, Description of Embodiments, Line 2; Delete "Do," and insert --$D_\theta$,-- therefor Column 6, Description of Embodiments, Line 32; Delete "Do)." and insert --$D_\theta$).-- therefor Column 7, Description of Embodiments, Line 11; Delete "Do)" and insert --$D_\theta$)-- therefor Signed and Sealed this
Fifteenth Day of December, 2020

Andrei Iancu
*Director of the United States Patent and Trademark Office*